United States Patent
Buresh et al.

(10) Patent No.: US 11,498,364 B2
(45) Date of Patent: Nov. 15, 2022

(54) TIRE WITH IMPROVED HANDLING PERFORMANCE AND SPEED DURABILITY

(71) Applicant: COMPAGNIE GENERALE DES ETABLISSMENTS MICHELIN, Clermont-Ferrand (FR)

(72) Inventors: Patrick Jon Buresh, Bend, OR (US); Jason Schoenmaker, Simponville, SC (US); Robert Dillon, Piedmont, SC (US); Phillip William Check, Simpsonville, SC (US); William Marshall Thompson, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 149 days.

(21) Appl. No.: 16/959,073

(22) PCT Filed: Dec. 30, 2017

(86) PCT No.: PCT/US2017/069141
§ 371 (c)(1),
(2) Date: Jun. 29, 2020

(87) PCT Pub. No.: WO2019/133010
PCT Pub. Date: Jul. 4, 2019

(65) Prior Publication Data
US 2020/0331299 A1    Oct. 22, 2020

(51) Int. Cl.
*B60C 11/00*        (2006.01)
*B60C 9/22*         (2006.01)
(Continued)

(52) U.S. Cl.
CPC ............ *B60C 9/2006* (2013.01); *B60C 9/22* (2013.01); *B60C 11/005* (2013.01); *B60C 11/01* (2013.01);
(Continued)

(58) Field of Classification Search
CPC ..... B60C 3/04; B60C 11/0041; B60C 11/005; B60C 11/1259; B60C 11/1272;
(Continued)

(56) References Cited

U.S. PATENT DOCUMENTS

2012/0085471 A1    4/2012  Horiguchi
2013/0153100 A1    6/2013  Piffard et al.
(Continued)

FOREIGN PATENT DOCUMENTS

DE    11201007267 T5    9/2015
DE    112012007265 T5    5/2022
(Continued)

OTHER PUBLICATIONS

International Search Report w Written Opinion for PCT/US2017/069137 dated Sep. 11, 2018.
International Search Report w Written Opinion for PCT/US2017/069141 dated Oct. 31, 2018.
ASTM International Designation: F1805-12; Standard Test Method for Single Wheel Driving Traction in a Straight Line or Snow- and Ice-Covered Surfaces; no dated listed.
(Continued)

*Primary Examiner* — Justin R Fischer
(74) *Attorney, Agent, or Firm* — Hahn Loeser & Parks LLP; Bret A. Hrivnak (57) ABSTRACT

Embodiments of the disclosure include a pneumatic tire having improved high speed limits while generally maintaining wear, traction, and handling performance. Said tires include a cap ply extending substantially across a full width of at least one of the belt plies and being arranged at least
(Continued)

partially within each shoulder, the cap ply forming a layer of elastomeric material reinforced with a plurality of elongate reinforcements spaced apart in an array, the cap ply being characterized as having a rupture force greater than 210 N per 15 mm of the cap ply width. In each shoulder area of said tires, the tread is characterized as being flatter and having a greater tread thickness.

14 Claims, 5 Drawing Sheets (51) Int. Cl.
*B60C 9/20* (2006.01)
*B60C 11/01* (2006.01)
*B60C 9/18* (2006.01)
(52) U.S. Cl.
CPC ........... *B60C 2009/1828* (2013.01); *B60C 2009/2016* (2013.01); *B60C 2009/2019* (2013.01); *B60C 2009/2228* (2013.01); *B60C 2011/0033* (2013.01)
(58) Field of Classification Search
CPC ....... B60C 2011/129; B60C 2011/0033; B60C 2011/0016
See application file for complete search history.

(56) References Cited

U.S. PATENT DOCUMENTS

| | | |
|---|---|---|
| 2014/0230980 A1 | 8/2014 | Guichon et al. |
| 2015/0321519 A1 | 11/2015 | Obana |

FOREIGN PATENT DOCUMENTS

| | | |
|---|---|---|
| EP | 0402303 A1 | 12/1990 |
| EP | 0439238 A2 | 7/1991 |
| EP | 0543661 A1 | 5/1993 |
| EP | 2505386 A1 | 10/2012 |
| JP | H04100707 A | 4/1992 |
| JP | H07276924 A | 10/1995 |
| JP | 4008013 B1 | 1/2008 |
| JP | 2009542528 A | 12/2009 |
| JP | 2016124438 A | 7/2016 |
| WO | 200808069 A1 | 1/2008 |
| WO | 2013048682 A1 | 4/2013 |
| WO | 2015193805 A1 | 12/2015 |
| WO | 2017/115195 A1 | 6/2017 |

OTHER PUBLICATIONS

General Motors Engineering Publication PPG 11681, Prediction of Half-Depth Snow Traction Using Tread Geometry; Jun. 15, 1987.
SAE Technical Papers Series, General Motors 800836, Prediction of Driving Traction Performance on Snow; Jun. 9-13, 1980.

TIRE WITH IMPROVED HANDLING PERFORMANCE AND SPEED DURABILITY

FIELD

Embodiments of this disclosure relate generally to pneumatic tires.

BACKGROUND

In the design of pneumatic tires, it is desirous to achieve any of a variety of performance parameters. It is often the case that to achieve certain performance goals, other performance measures are sacrificed. In particular instances, when attempting to improve high speed durability, maintenance of desired tread thicknesses in the shoulder areas has been sacrificed. By virtue of employing thinner tread thickness in the shoulder areas, not only is the available wear life reduced shallower grooves are provided, thereby reducing wet and snow performance. Additionally, to improve high speed durability, the lateral tread profile in the shoulder has been further rounded. By rounding the shoulder areas, as compared to a flatter tread profile, available tread contact area is reduced resulting in a reduction in traction and wear performance. Accordingly, there is a need to provide improved high speed durability performance without reducing wear, hydroplaning, and snow traction performance.

SUMMARY

Embodiments of the disclosure include a pneumatic tire. In particular embodiments, the tire comprises: a pair of annular bead areas spaced apart axially along a rotational axis of the tire; a pair of sidewalls spaced apart axially along the rotational axis of the tire, each sidewall of the pair of sidewalls extending outwardly in a radial direction from one bead area of the pair of bead areas relative to the rotational axis; and, a crown portion arranged widthwise between the pair of sidewalls and extending annularly around the tire. The crown portion includes a tread arranged annularly around the crown portion and forming an outer, ground-engaging side upon which the tire is intended to roll upon, the tread having a thickness extending radially and a width extending axially, the tread forming a wearing portion the tire. The crown portion further includes one or more belt plies each forming a layer of elastomeric material reinforced with a plurality of elongate reinforcements spaced apart in an array. The crown portion further including a pair of shoulders, each shoulder forming a portion of the crown arranged adjacent to each sidewall. The crown portion further includes a cap ply arranged radially outward from the one or more belt plies and between the tread and the one or more belt plies, the cap ply extending substantially across a full width of at least one of the belt plies and being arranged at least partially within each shoulder, the cap ply forming a layer of elastomeric material reinforced with a plurality of elongate reinforcements spaced apart in an array, the cap ply being characterized as having a rupture force greater than 210 N per 15 mm of the cap ply width. The tread includes a plurality of tread features including grooves extending a depth within the tread thickness which includes. The tread features extend into the tread thickness substantially to a depth defining a skid depth of the tread, the skid depth being the thickness of the tread intended to be worn during the intended life of the tire tread. At each widthwise extent of the radially outermost belt ply, each widthwise extent defined by the center of the laterally outermost reinforcement at its most laterally outward location, the tread thickness extending in a direction perpendicular to the outer, ground-engaging side by is greater than 61% of the skid depth at the equatorial plane. At each widthwise extent of the rolling width, the tread thickness extending in a direction perpendicular to the outer, ground-engaging side is greater than 52% of the skid depth at the equatorial plane. At each widthwise extent of the radially outermost belt layer, as defined by the center of the laterally outermost reinforcement at its most laterally outward location, the tread thickness extends a radial distance from a horizontal line, the horizontal line extending from the skid depth at the equatorial plane, the radial distance extending to a bottom of the skid depth and equaling 50% to 80% of the skid depth at the corresponding widthwise extent of the radially outermost belt layer, where for a taper equation of $d_x = d_D (L_x/L_D)^P$, P is less than 3. It is appreciated that other variations of the tire may vary by incorporating more or less features as described hereinafter in any combination or by varying the present features as described hereinafter.

The foregoing and other objects, features, and advantages will be apparent from the following more detailed descriptions of particular embodiments, as illustrated in the accompanying drawings wherein like reference numbers represent like parts of particular embodiments.

DETAILED DESCRIPTION OF THE DRAWINGS

DETAILED DESCRIPTION OF PARTICULAR EMBODIMENTS

While reducing the tread thickness in the shoulder areas of a tire and providing a rounder tread profile in the shoulder areas generally improves high speed tire durability, doings so also reduces wear performance, wet performance, and traction through the reduction in tread depths, groove depths, and available contact surface area. The present disclosure provides tires characterized as having increased tread thickness in the shoulder areas, which thereby increases groove depths in the shoulder areas, as well as having wet performance and traction, which has not been achieved previously, such as with passenger high performance tires.

For purposes of describing the invention, reference will now be made to particular exemplary embodiments, one or more examples of which are illustrated in particular figures, or in association with particular figures. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with the features or steps of another embodiment to yield other embodiments or methods. Thus, it is intended that the present invention covers such modifications and variations as come within the scope of the appended claims and their equivalents.

The following terms are defined as follows for this disclosure:

"Axial direction" or the letter "$A_d$" in the figures refers to a direction parallel to the axis of rotation A of the tire or tire carcass, and its components, such as the outer band and inner hub, when rolling along a ground surface. "Lateral direction" or "widthwise direction" or the letter $LAT_d$ is synonymous with axial direction $A_d$.

"Radial direction" or the letter "$R_d$" in the figures refers to a direction that is orthogonal to the axial direction and extends in the same direction as any radius that extends orthogonally from the axial direction. "Radially inward" means in the radial direction $R_d$ towards rotational axis A. "Radially inward" means in the radial direction $R_d$ away from rotational axis A.

"Circumferential direction," or the letter "$C_d$" in the figures, refers to a direction that is orthogonal to the axial direction and orthogonal to a radial direction. The circumferential direction is the direction of the tire along which it rolls or rotates and that is perpendicular to the axis of rotation of the tire. The circumferential direction is also referred to as a longitudinal direction $LONG_d$.

A "groove" is any elongate void or channel arranged within the tread having a pair of opposing sidewalls extending depthwise into the tread and that which are spaced apart greater than 1.6 mm or, in other variations, by at least 2.0 mm or otherwise by an average distance as measured between the sidewalls for the entire depth of the groove that is greater than 1.6 mm or by 2.0 mm or more. A groove is designed to have a width, based upon the depth of the groove, to remain open as the tread rolls into, through, and out of a contact patch. A "lateral groove" is a groove that extends in a direction oblique to the longitudinal direction (the circumferential direction). A "longitudinal groove" is a groove that extends substantially in the longitudinal direction. A "circumferential groove" is synonymous with a longitudinal groove, each of which extends annularly around the tire.

A "sipe" is any elongate void or incision arranged within the tread having a pair of opposing sidewalls extending depthwise into the tread and that which are spaced apart by less than 2.0 mm or 1.6 mm or less in other variations or otherwise by an average distance as measured between the sidewalls for the entire depth of the groove that is less than 2.0 mm or 1.6 mm or less. Sidewalls of the sipe come into contact from time to time as the tread rolls into and out of the contact patch of the tire as the tire rolls on the ground. By lateral sipe, it is meant a sipe that extends in a direction that is oblique to the longitudinal direction.

A "tread element" is portion of the tread defined by one or more grooves and/or sipes arranged along the outer, ground-engaging side of the tread. Examples of tread elements include tread blocks and ribs.

A "rib" is a tread element that runs substantially in the longitudinal direction $L_d$ of the tire and that is bounded by a pair of longitudinal grooves or by a longitudinal groove and any of the pair of lateral sides defining a width of the tread. A rib may include any lateral features, which includes any lateral grooves and lateral sipes, as well as any arrangement of tread blocks.

A "tread block" is a tread element having a perimeter that is defined by one or more grooves with or without a lateral side of the tread, thereby creating an isolated structure in the tread. A sipe does not define any portion of a tread block perimeter.

A "contact patch" is the total area contained within a perimeter defining an area of contact, the area of the contact patch including the area of contact contained within the perimeter and any void arranged within the area of contact.

"Elastic material" or "elastomer" as used herein refers to a polymer exhibiting rubber-like elasticity, such as a material comprising rubber, whether natural, synthetic, or a blend of both natural and synthetic rubbers.

"Elastomeric" as used herein refers to a material comprising an elastic material or elastomer, such as a material comprising rubber.

"Modulus of elongation" (MPa) was measured at 10% strain (MA10), at 100% strain (MA100), or at 300% strain (MA300) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

Hysteresis or hysteretic loss is denoted as P60 and is measured as a percentage rebound at the sixth rebound at 60° C., in accordance with the following equation:

$$HL(\%)=100\times((W0-W1)/W1),$$

in which W0 is the energy supplied and W1 is the energy returned. P60 is obtained through a P8 test that employs a pendulum that is permitted to repeatedly strike and rebound from a test sample.

"Resilient" as used herein means configured to bend and flex elastically without plastic or permanent deformation under intended operating conditions.

"Rigid" as used herein means generally unable to elastically or plastically bend or be forced out of shape under intended operating conditions, as opposed to being resilient.

Cords are said to be inextensible when the said cords under a tensile force equal to 10% of the rupture force, exhibit a strain of at most 0.2%. Cords are said to be elastic when the said cords are under a tensile force equal to the rupture load exhibit a strain of at least 3% with a maximum tangent modulus of less than 150 GPa (gigapascals). As far as the metal cords or threads are concerned, the "rupture force" (maximum load in N (Newtons)), rupture strength (in MPa (megapascals)) and elongation at break (total elongation in %) measurements are taken under tensile load in accordance with standard ISO 6892, 1984 at a temperature of 23° C.

Figure 3:
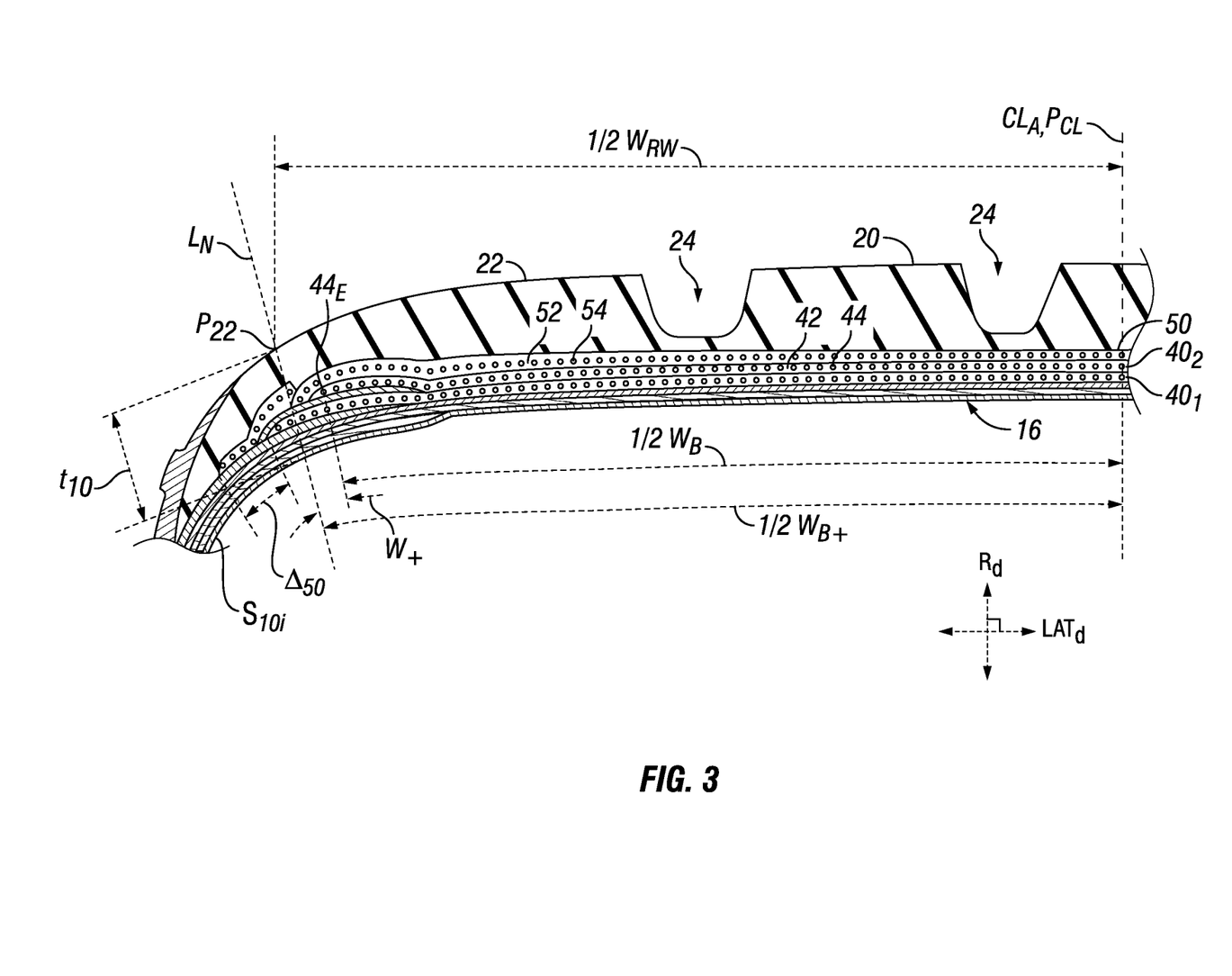
FIG. 3 is a sectional view of the tire shown in FIG. 1, showing how to measure rolling width.

"Rolling width," with reference to FIG. 3, refers to a width $W_{RW}$ of the tread 20 that defines a width of the outer, ground-engaging side 22 of the tread 20. This width $W_{RW}$ is defined in accordance with FIG. 3, whereby a distance $W_B$ is measured along the radially outermost belt ply $40_2$ to the center of the last elongate reinforcement 44 in said ply $40_2$ at each widthwise extent of said outermost belt ply $40_2$. In this instance, ½ of $W_B$ is shown. Upon obtaining this dimension, an additional 3 mm (millimeters) is added to each widthwise extent of $W_B$ (6 mm in total) along the same curvilinear path along which $W_B$ extends, where the 3 mm addition is represented by $W_+$. An imaginary line $L_N$ extending normal to the curvilinear path along which $W_{B+}$ extends at each widthwise extent of $W_{B+}$ intersects the outer, ground-engaging side 22 at point $P_{22}$. At each lateral side of the tread, opposing points $P_{22}$ as measured in the lateral direction $LAT_d$ define the rolling width $W_{RW}$ of the tread 20 and outer, ground-engaging side 22, where in FIG. 3 one half (½) of $W_{RW}$ is shown.

"Skid depth" or $SD_{20}$ is defined as the thickness of the tread extending from the outer, ground-engaging side of the tread to the deepest "tread feature" (that is, any longitudinal or lateral groove or sipe) extending into the tread. Any thickness of the tread extending radially inward from the skid depth is referred to as the undertread thickness. In particular instances, with reference to FIG. 1, the skid depth $SD_{20}$ extends along a curvilinear path laterally across the tread and between adjacent longitudinal grooves 24, intersecting each longitudinal groove bottom 26 and extending further along an arcuate path into each shoulder rib $32_{S1}$, $32_{S2}$ at the depth of the deepest lateral groove or sipe, where the skid depth $SD_{20}$ may or may not be arranged substantially the same distance from the radially outermost cap ply 50 or, if no cap ply is present, the radially outermost belt ply 40 for distance $W_B$. The skid depth defines the useful thickness of the tread intended to be worn during the life of the tire.

Figure 4:
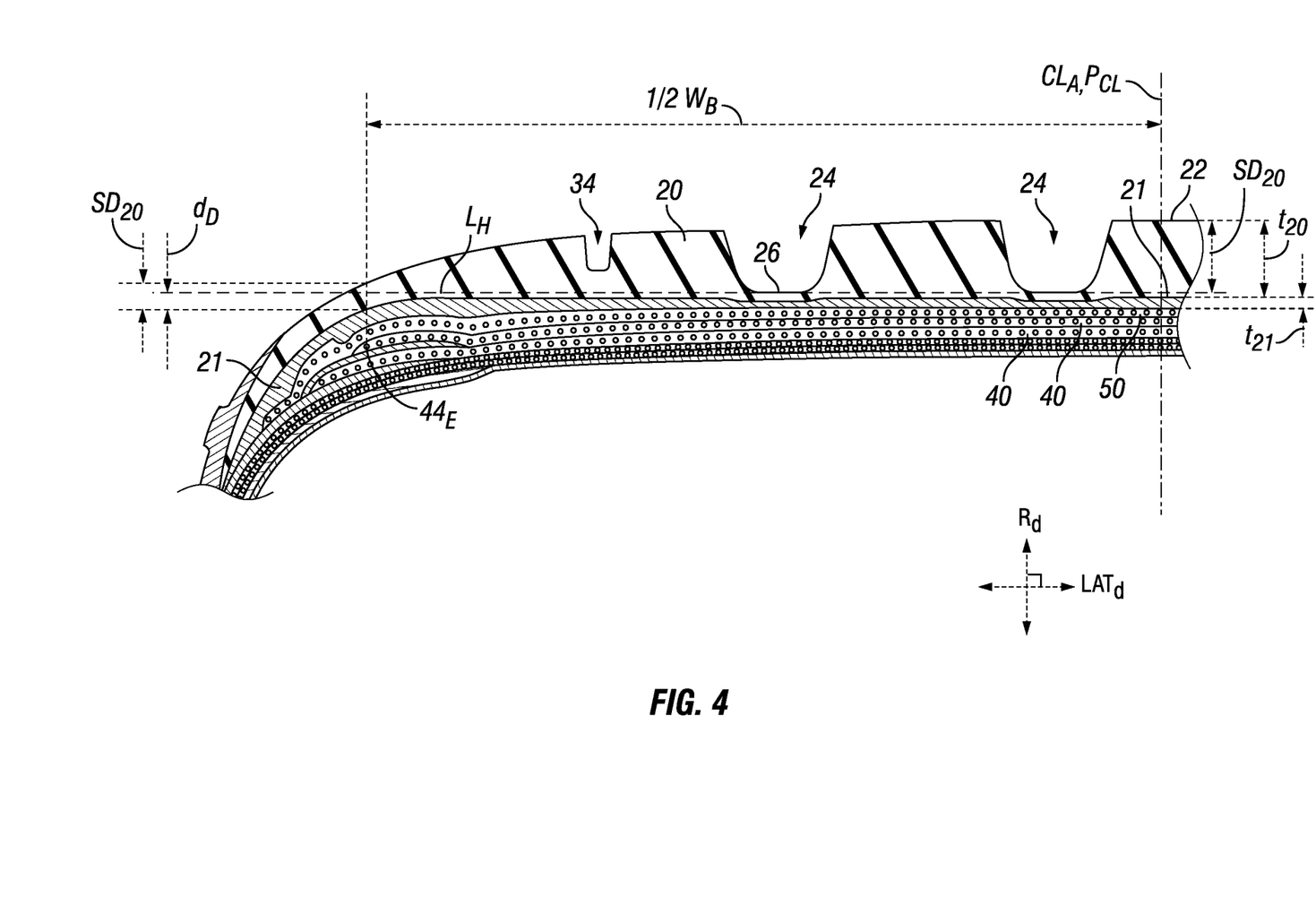
FIG. 4 is a sectional view of the tire shown in FIG. 1, showing how to measure droop in a particular embodiment; and, FIG. 5 is a sectional view of the tire shown in FIG. 1, showing how to measure taper in a particular embodiment.

"Droop" means the amount of drop d from the skid depth $SD_{20}$ at the widthwise extent of the belt relative to the skid depth at the equatorial axis of the tire, the droop being measured in the radial direction $R_d$. With reference to FIG. 4, for example, horizontal line $L_H$ extends axially outward (in direction of $A_d$) from the skid depth $SD_{20}$ at equatorial plane $P_{CL}$. Droop or drop d is the distance from line $L_H$ to the skid depth $SD_{20}$ measured in the radial direction $R_d$ (normal to line $L_H$) along a line that intersects the center of the last elongate reinforcement $44_E$ of the radially outermost belt layer $40_2$, which is the location of the widthwise extent of distance $W_B$.

Figure 5:
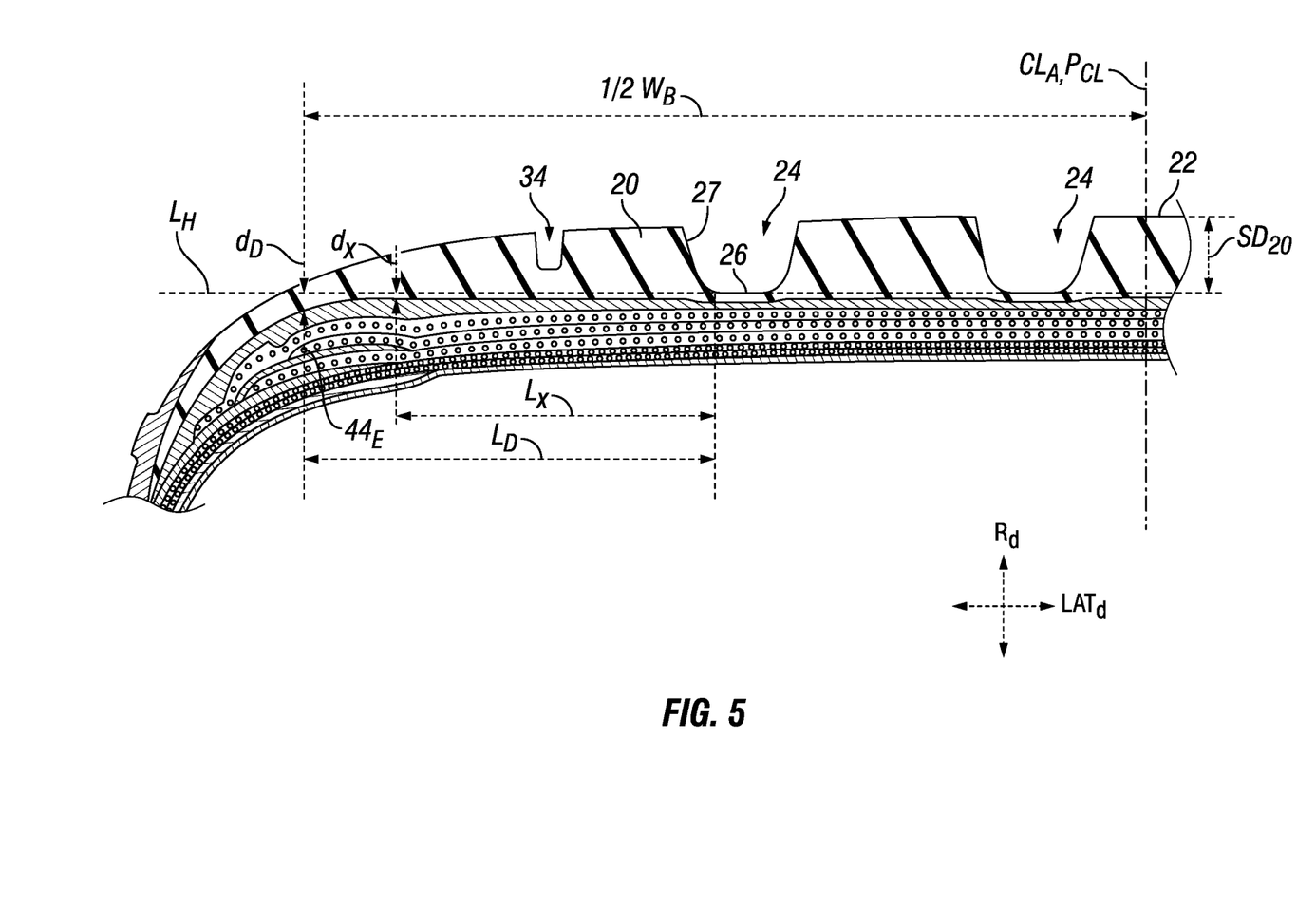

"Taper" defines amount of deviation between the skid depth $SD_{20}$ and the horizontal line $L_H$ extending axially outward (in direction of $A_d$) from the skid depth $SD_{20}$ at equatorial plane $P_{CL}$ as the skid depth $SD_{20}$ extends laterally outward toward a shoulder 18 from a bottom 26 of the axially outermost longitudinal groove 24. With reference to FIG. 5, taper can be described by the following equation:

$$d_x = d_D(L_x - L_D)^P,$$

where distance $L_x$ is any distance extending laterally from the laterally outermost longitudinal groove bottom 26 up to distance $L_D$, where distance $L_D$ terminates at a radial line that intersects the center of the last elongate reinforcement $44_E$ of the radially outermost belt layer $40_2$, or, to the widthwise extent of $W_B$. Distances $L_x$ and $L_D$ extend in the lateral direction $LAT_d$ (that is, axial direction $A_d$) and while droop $d_x$ is the droop at any corresponding lateral location $L_x$ and droop $L_D$ is the droop at distance $L_D$. P is referred to as the taper power.

"Longitudinal contact surface ratio" (longitudinal CSR) is the contact surface ratio of the longitudinal grooves. This is the total area contained within a contact patch ($A_c$) minus the total projected void area of the longitudinal grooves ($A_{long}$) as located along the outer, ground-engaging side of the tire tread, which extends annularly around the tire and laterally along the rolling width of the outer, ground-engaging side divided by the total area of the contact patch ($A_c$) that which includes the total projected void area of the longitudinal grooves ($A_{long}$). Both areas are measured in mm². This relationship can be expressed in terms of the following equation: Longitudinal $CSR = (A_c - A_{long})/A_c$, where the equation yields a dimensionless number.

The "maximum tan delta" dynamic properties for the elastomeric compositions were measured at 23° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 23° C. Scanning was effected at an amplitude of deformation of 0.05 to 50% (outward cycle) and then of 50% to 0.05% (return cycle). The maximum value of the tangent of the loss angle tan delta (max tan δ) was determined during the return cycle.

Dynamic properties "Tg" and "G*" for the elastomeric compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from 60° C. to 100° C. with the temperature increasing at a rate of 1.5° C./min. The dynamic shear modulus G* at 60° C. was captured and the temperature at which the max tan delta occurred was recorded as the glass transition temperature, Tg.

Use is made of an oscillating consistometer as described in Standard ASTM D1646 (1999). The "Mooney plasticity" or "Mooney viscosity" measurement is carried out according to the following principle: the sample, analyzed in the uncured state (i.e., before curing) is molded in a cylindrical chamber heated to a given temperature (for example 100° C.). After preheating for one minute, the rotor rotates within the test specimen at 2 revolutions/minute and the working torque for maintaining this movement is measured after rotating for 4 minutes. Mooney viscosity (ML 1+4) is expressed in "Mooney unit" (MU, with 1 MU=0.83 newton-meter N-m). For greater readability, the results will be shown in base 100, the value 100 being assigned to the control. A result of less than 100 will indicate a decrease in the value concerned and, conversely, a result of greater than 100 will indicate an increase in the value concerned.

To measure the "cornering stiffness," each tire is run at a constant speed of 80 km/h on an appropriate automatic machine (machine of the "flat track" rolling road type marketed by the company MTS), by varying the load denoted "Z", which is a vertical or radial load. under a drift angle of 1 degree, and the drift thrust was measured continuously to identify the drift thrust or cornering stiffness denoted "D" (corrected for the drift thrust at zero drift angle), by using sensors to record the transverse load on the wheel as a function of this load "Z"; this then gives the drift thrust or cornering stiffness.

Figure 1:
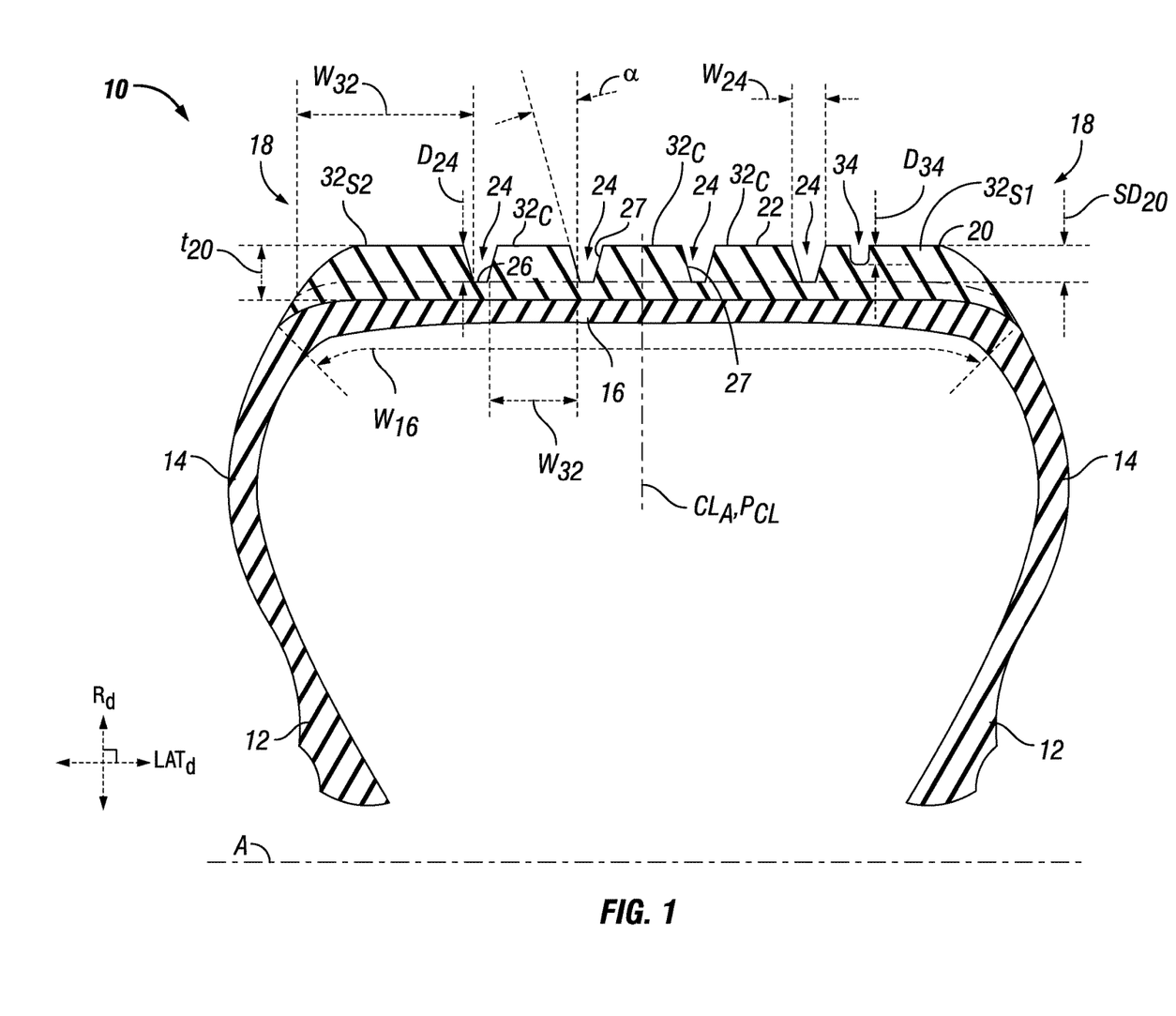
FIG. 1 is a sectional view of a tire taken along a plane extending in both a radial direction and an axial direction, the plane extending through the rotational axis, in accordance with an exemplary embodiment.

With reference to FIG. 1, a pneumatic tire 10 is shown to generally comprise a pair of annular bead areas 12 spaced apart axially (that is, in axial direction $A_d$) along a rotational axis A of the tire 10, a pair of sidewalls 14 spaced apart axially along the rotational axis A of the tire 10, and a crown portion 16 arranged widthwise between the pair of sidewalls 14 and extending annularly around the tire 10. Each sidewall 14 extends outwardly in a radial direction $R_d$ from one bead area 12 of the pair of bead areas 12 relative to the rotational axis A. In extending widthwise between the pair of sidewalls 14, it is a width $W_{16}$ of the crown portion 16 extending between the sidewalls. Rolling width $W_{RW}$ of the tread 20 and outer, ground-engaging side 22 is also shown. Shoulder area is generally designated as 18, and includes shoulder ribs $32_{S2}$, $32_{S2}$.

With continued reference to FIG. 1, the crown portion 16 includes a tread 20 arranged annularly around the crown portion 16 and forming an outer, ground-engaging side 22 upon which the tire 10 is intended to roll upon. The tread 20 has a thickness $t_{20}$ extending in a direction perpendicular to the outer, ground-engaging side 22 and in a direction toward the rotational axis A of the tire. Tread thickness $t_{20}$ extends from the outer, ground-engaging side 22 to a skid depth $SD_{20}$ of the tread to define a thickness of the tread intended to be worn during the lifetime of the tire (that is, a wearing depth or thickness of the tire tread). The skid depth $SD_{20}$ is commonly, but not necessarily, arranged at a depth corresponding to the bottom 26 of the deepest longitudinal groove 24. While not necessary, it is commonly the case, such as is shown, where the bottom 26 of all circumferential (longitudinal) grooves 24 is arranged at the skid depth $SD_{20}$. In such instances, while each circumferential (longitudinal) groove depth $D_{24}$ may or may not be of the same depth $D_{24}$, in the exemplary embodiment shown, all circumferential grooves 24 are of equal depth $D_{24}$ and extend to and terminate at the skid depth $SD_{20}$. In certain instances, the average depth $D_{24}$ for all circumferential grooves 24 is 8.5 mm. This average is calculated over the full circumference of the tire 10. In particular instances, the skid depth $SD_{20}$ is measured at a widthwise (axial) centerline $CL_A$ of the tread 10, the centerline $CL_A$ extending along an equatorial plane $P_{CL}$, where at this location the skid depth $SD_{20}$ is 8.5 mm, but may remain the same or vary across the width of the tread. For example, in the FIG. 1 the skid depth $SD_{20}$ remains generally constant until reaching each shoulder 18, while in FIGS. 4 and 5 the skid depth $SD_{20}$ gradually decreases as the tread extends laterally along its width.

It is noted that the tread thickness $t_{20}$ may generally extend radially inward deeper to the tread beyond the skid depth $SD_{20}$, such as is generally shown in FIG. 1. Tread 20 defines a wearing layer configured and intended to engage a ground surface by way of the outer, ground-engaging side 22 throughout the intended worn life of the tread 20, and may be formed of a single elastomeric material formulation or may comprise a plurality of sub layers formed of different elastomeric material formulations. With reference now to FIG. 4, an optional inner layer 21 is arranged below tread 20, where tread 20 extends to the skid depth $SD_{20}$ and optionally beyond radially inward. Inner layer 21 is arranged radially inward (in direction $R_d$) of the skid depth $SD_{20}$ (starting at or below skid depth $SD_{20}$) and is configured and intended to be a non-wearing layer of the tire, such that it is not intended to form a portion of the outer, ground-engaging side 22 during the intended worn life of the tread 20. Inner layer 21 is arranged radially outward (in direction $R_d$) from belt plies 40 and cap ply 50. Inner layer 21 does not include any elongate reinforcements. In particular embodiments, inner layer 21 may form 15% to 35% of the total volume of elastomeric material forming tread 20. In particular instances, inner layer 21 may have a thickness $t_{21}$ as thin as 1 to 2 mm, and which may be greater as desired up to $SD_{20}$. In certain embodiments, the inner layer thickness $t_{21}$ may extend up to 4 mm or otherwise to maximize the volume between the skid depth $SD_{20}$ and the radially outermost reinforced ply, such as any cap ply 50 or belt ply 40, to achieve the desired improvements in rolling resistance. Accordingly, other inner layer thicknesses may be employed in other variations. Inner layer 21 does not form any gum layer or adhesive that may be used to attach a tread to a tire, but rather forms a sub layer to tread 20 having a volume as desired to achieve the material properties desirous to form a tire that achieves the intended tire performance parameters (rolling resistance performance). It is appreciated that inner layer 21 may be formed separate from tread 20 or may be formed therewith, such as when coextruding both tread 20 and inner layer 21 together. In other variations, inner layer 21 is not present, where the tread may partially or full fill the volume otherwise consumed by the inner layer 21.

The purpose of inner layer 21 is to provide elastomeric material characterized as having a hysteresis (P60) lower than the elastomeric material forming tread 20, which assists in reducing rolling resistance and controlling tire operating temperatures (so that the tires run cooler). In particular embodiments, the inner layer 21 is characterized as having a dynamic shear modulus (G*) ranging from 58% to 68% of the dynamic shear modulus (G*) of the tread 20, a modulus of elongation (MA10) ranging from 40% to 60% or substantially 50% of the modulus of elongation (MA10) of the tread 20, and for a maximum tan delta from 60% to 75% of the maximum tan delta of the tread 20.

Because it is often desired to maximize traction by way of the tread through the selection of elastomeric material, tire treads are commonly formed of elastomeric material formulated for elevated traction (grip) performance Such traction formulations, however, increase rolling resistance and thereby reduce rolling resistance performance By substituting at least a portion of the tread thickness $t_{20}$ below the skid depth $SD_{20}$ otherwise formulated for elevated traction with elastomeric material having low hysteresis by way of the inner layer 21, an overall reduction in rolling resistance is achieved without sacrificing traction, since higher traction tread 20 remains. Therefore, while prior art treads may employ a single layer of elastomeric material, the tread herein includes an inner layer 21 having improved hysteretic properties (lower) relative to the elastomeric material(s) forming the skid depth $SD_{20}$ of the tread 20. As a result, use of lower hysteretic the inner layer 21 provides improved rolling resistance performance while maintaining traction benefits associated with tread 20.

Figure 2:
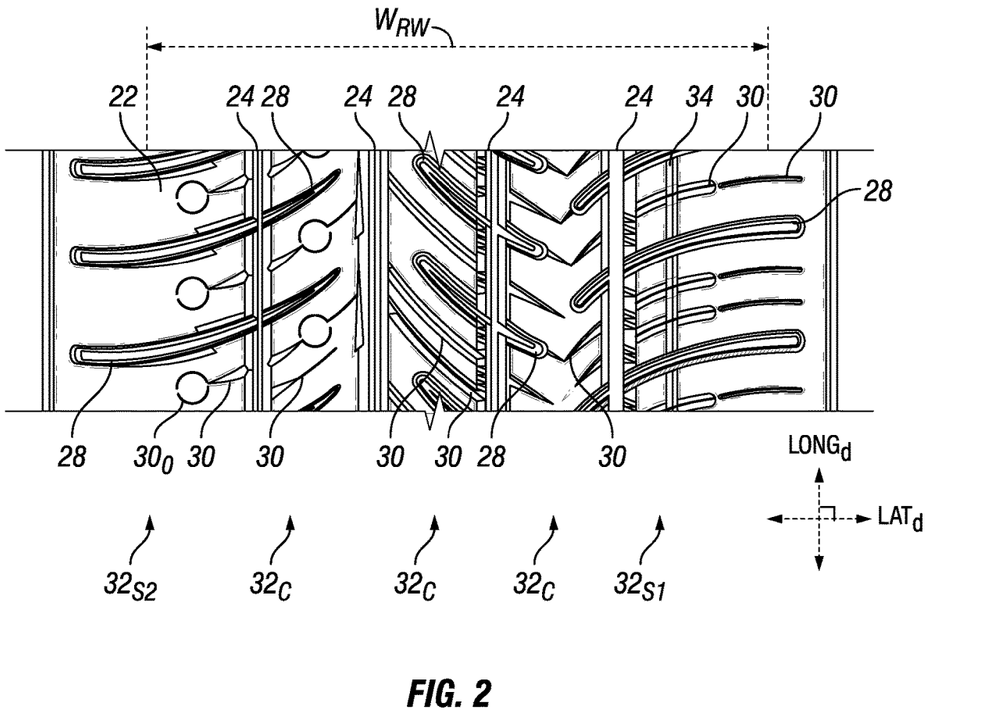
FIG. 2 is a top view of a portion of the tire tread shown in FIG. 1, in accordance with an exemplary embodiment.

With reference to FIGS. 1 and 2, the tire tread 20 includes a plurality of features extending a depth within the tread thickness that include longitudinal (circumferential) grooves 24, lateral grooves 28, and lateral sipes 30. These features are arranged along the outer, ground-engaging side 22, although any such feature may be submerged below the outer, ground-engaging side 22 to be later exposed after a particular depth of the tread 20 has been worn away. In the embodiment shown, the longitudinal grooves 24 are arranged to form a plurality of ribs 32, each rib extending annularly around the tread such that adjacent ribs are separated by one of the longitudinal grooves 24. The plurality of ribs include a first shoulder rib $32_{S1}$, a second shoulder rib $32_{S2}$, and a plurality of central ribs $32_C$. Each of the first and second shoulder ribs $32_{S1}$, $32_{S2}$ are arranged along one of opposing widthwise extents of the outer, ground-engaging side 22, where the plurality of central ribs $32_C$ are arranged axially (laterally) between the first and second shoulder ribs $32_{S1}$, $32_{S2}$. Generally, in combination with the different embodiments contemplated herein, each of the ribs $32_{S1}$, $32_{S2}$, $32c$ may be characterized as having any desired width, where the rib widths $W_{32}$ may be the same or different between the ribs $32_{S1}$, $32_{S2}$, $32_C$. In particular instances, each of the first and second shoulder ribs have a width $W_{32}$ equal to 24% to 29% of the tread width. Further, in certain instances, the width $W_{32}$ of each first and second shoulder rib $32_{S1}$, $32_{S2}$ has a width $W_{32}$ equal to 150% to 170% of an average width of the central ribs $32_C$, $32_{S2}$. The width $W_{32}$ of each shoulder rib is measured from the adjacent, widthwise extent of the rolling width $W_{RW}$ of the tire as described herein. While the average width $W_{32}$ of each central rib $32_C$ may be different than any one or more of the other central ribs $32_C$, in particular instances the average width $W_{32}$ of each central rib is substantially the same. It is appreciated that while any number of ribs may be employed, in certain embodiments the tread has 5 ribs (shown) or 6 ribs (not shown). In the embodiment shown, the tire tread features form an asymmetrical, non-directional tire tread pattern design, where non-directional means that the tire may be mounted in to rotate in either of opposing circumferential directions. It is appreciated, however, that a directional tread pattern design may also be employed.

With continued reference to FIG. 1, it is also noted that longitudinal grooves 24 each has a width $W_{24}$ defined by a pair of opposing groove sidewalls 27. It is appreciated that each of the longitudinal grooves 24 may have the same of different widths $W_{24}$, and in particular embodiments the longitudinal groove widths $W_{24}$ are selected to provide the longitudinal contact surface ratios discussed elsewhere herein. While each groove sidewall 27 may extend into the tread thickness $t_{20}$ at any angle cc relative to a direction perpendicular to the outer, ground-engaging side 22, in particular exemplary instances each groove sidewall 27 extends at an angle α measuring 2° to 12° relative to a direction perpendicular to the outer, ground-engaging side 22. As noted previously, each longitudinal groove 24 has a depth $D_{24}$ extending into the tread thickness to a bottom 26, where all of the longitudinal grooves may be of the same or different depth $D_{24}$. With reference to FIG. 2, it is noted as well that tread 20 includes lateral grooves 28 and lateral sipes 30, all of which together are referred to as lateral features. While the depths of the lateral grooves 28 and lateral sipes 30 may vary, in particular embodiments, the lateral grooves 28 and lateral sipes 30 extend substantially the full skid depth $SD_{20}$ of the tread 20.

With reference to FIG. 4, it is noted that at each widthwise extent of the radially outermost belt layer $40_2$, as defined by the center of the laterally outermost reinforcement $44_E$ at its most laterally outward location, the tread thickness $t_{20}$ extends a radial distance d (droop or drop) from a horizontal line $L_H$ to a bottom of the skid depth at the corresponding widthwise extent of the outermost belt layer $40_2$, the radial distance (droop) d equals substantially 65% of the total skid depth $SD_{20}$ measured in the radial direction $R_d$ at the same lateral location. In other instances, the droop d is less than 78% or ranges from 50% to 80% of the skid depth at that laterally outward location of the tire. Horizontal line $L_H$ extends axially outward (in direction of $A_d$) from the skid depth $SD_{20}$ at equatorial plane $P_{CL}$.

With reference now to FIG. 5, in particular embodiments, the taper of the droop d in any instance contemplated above, as defined by the equation $d_x=d_D)(L_x/L_D)^P$, is characterized as having a taper power P that is less than 3 or, in other variations, ranges from 2 to 2.7. In the prior art tires described herein, the droop is 78% or greater and has a taper characterized by the prior equation having a taper power P equal to or greater than 3.

It is noted that at each widthwise extent of the radially outermost belt ply $40_2$, as defined by the center of the laterally outermost reinforcement 44 at its most laterally outward location, the tread thickness $t_{20}$ or skid depth $SD_{20}$ extending in a direction perpendicular to the outer, ground-engaging side 22 is greater than 61%, or in other variations, 68% to 70% of the skid depth $SD_{20}$ at the equatorial plane $P_{CL}$. It is also noted that at each widthwise extent of the rolling width $W_{RW}$, the tread thickness extending in a direction perpendicular to the outer, ground-engaging side 22 is greater than 52% or, in other variations, 62% to 64% of the skid depth $SD_{20}$ at the equatorial plane $P_{CL}$. In certain instances, the tread depth $t_{20}$ or skid depth $SD_{20}$ at a shoulder as described above is 3.1 mm to 8.2 mm.

With reference to FIG. 3 regarding the total thickness $t_{10}$ of the tire at each widthwise extent of the rolling width $W_{RW}$, the total thickness $t_{10}$ of the tire extending from an interior side $S_{10i}$ to the outer, ground-engaging side 22 in a direction perpendicular to the outer, ground-engaging side 22 is less than 480% of the skid depth $SD_{20}$ at the equatorial plane $P_{CL}$, or in other variations 400% to 450% or substantially 425% of the skid depth $SD_{20}$ at the equatorial plane $P_{CL}$.

In any embodiment contemplated herein, the tread 20 is formed of elastomeric material, such as any natural or synthetic rubber, or any blend thereof. In particular instances, the tread is substantially formed of an elastomeric material to provide elevated traction (grip) and which is characterized as having a glass transition temperature (Tg) of –25° C. to –10° C., a maximum tan delta of 0.4 to 0.6, a dynamic shear modulus (G*) of 1.0 to 1.4 MPa, a Mooney viscosity of 80 to 120, and a modulus of elongation (MA10) of 5.75 to 9.5. An elastomeric material so characterized may formed using any of a variety of formulations. In particular instances, the so characterized elastomeric material is a mixture including an elastomer, a filler, and a plasticizer. In this formulation, the elastomer ranges from an SBR/BR blend containing at least 70% SBR to 100% SBR, or in other variations a 70/30 or 85/15 blend of SBR and BR, respectively. "SBR" means styrene-butadiene rubber while "BR" means butadiene rubber. SBR is a functionalized elastomer. The filler in this formation comprises silica and carbon black, silica forming 23.5% to 25.9% and the carbon black forming 1% of the total elastomeric material mixture. The plasticizer in this formation forms 25% to 30% of the total elastomeric material mixture and comprising high Tg resin that forms 12% to 23% of the total elastomeric material mixture and highly oleic sunflower oil that forms the balance of the plasticizer (2% to 18%). It is appreciated that other formations may be employed to achieve the desired characteristics and properties.

The elastomers useful for forming the elastomeric material compositions disclosed herein, such as for the tread 20, may have any microstructure, such microstructure being a function of the polymerization conditions used, in particular of the presence or absence of a modifying and/or randomizing agent and the quantities of modifying and/or randomizing agent used. The elastomers may, for example, be block, random, sequential or micro-sequential elastomers, and may be prepared in dispersion or in solution; they may be coupled and/or starred or alternatively functionalized with a coupling and/or starring or functionalizing agent.

Functionalized rubbers, i.e., those appended with active moieties, are well known in the industry. The backbone or the branch ends of the elastomers may be functionalized by attaching these active moieties to the ends of the chains or to the backbone or mid-chains of the polymer. Exemplary functionalizing agents that could be included with the diene elastomers include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates and imines all of these being well-known in the art. Particular embodiments may include functionalized diene elastomers while other embodiments may be limited to including no functionalized elastomers.

Particular embodiments include at least 80 phr of a functionalized elastomer or alternatively at least 90 phr or 100 phr of a functionalized elastomer wherein the functional moiety interacts with the silica filler. Examples known in the art include silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973), wherein each of these mentioned documents are hereby incorporated herein by reference.

Particular embodiments of the rubber compositions disclosed herein are limited to those having at least 80 phr of the rubber components being highly unsaturated diene elastomers. Other embodiments are limited to having at least 90 phr or 100 phr of the highly unsaturated diene elastomer components.

Examples of suitable highly unsaturated diene elastomers include, but are not necessarily limited to natural rubber (NR) and synthetic rubbers such as polybutadienes (BR), polyisoprenes (IR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene terpolymers (SBIR). Any of these examples or mixtures of these examples are suitable for particular embodiments of the rubber compositions disclosed herein.

In particular embodiments, useful SBR elastomers may have a bound styrene content of between 1 mol % and 45 mol % or alternatively between 15 mol % and 40 mol % or between 20 mol % and 30 mol %. Particular embodiments of the rubber compositions disclosed herein include an SBR that is functionalized with a moiety that interacts with the silica filler.

With reference to FIG. 3, the crown portion 16 further includes one or more belt plies 40 (generally, but more specifically as first and second belt plies $40_1$, $40_2$) each forming a layer of elastomeric material 42 reinforced with a plurality of elongate reinforcements 44 spaced apart in an array, the one or more belt plies being arranged radially inward and below the tread. Together, the one or more belt plies form a "belt," the belt also being referred to as a "belt structure" and forming an annular structure formed by all of the one or more belt plies 40). Each elongate reinforcement 44 may be formed of metal or non-metal elongate reinforcements, where the elongate reinforcements 44 are formed of a plurality of filaments arranged lengthwise and twisted along their lengths as desired. Metal elongate reinforcements are constructed from filaments most commonly formed of steel, but may be formed any metal having desirous properties. Non-metal reinforcements are constructed from filaments formed of any fabric or textile, such as polyester, rayon, nylon, aramid, silk, and/or fiberglass. In the exemplary embodiment shown, the tire 10 includes a pair of belt plies 40 to form an annular belt structure, although any single belt ply 40 or three or more belt plies 40 may be employed to achieve the desired properties of the annular belt structure formed by any one or more belt plies 40.

In particular embodiments, the overall mass of each belt layer 40 is reduced in comparison to those used previously in prior art passenger tires, which thereby reduces the rolling resistance to generating an overall improvement in rolling resistance performance for tire 10. Additionally, or in the alternative, a lower hysteretic elastomeric material 44 may be employed, which also assists in reducing rolling resistance. Each of these may also reduce the operating temperature of the tire. For example, in particular embodiments, each of the elongate reinforcements 44 form a 0.60 mm thick steel cable. The cable is formed of two (2) twisted 0.3 mm diameter steel filaments. Each such elongate reinforcement 44 is characterized as having a 470 N rupture force, where in other variations when using other elongate reinforcements may range from 420 to 520 N. The elongate reinforcements 44 are arranged to extend lengthwise greater than 24 degrees and up to 32 degrees relative to the longitudinal direction $LONG_d$, and in other instances 26 degrees to 30 degrees, or substantially 28 degrees relative to the longitudinal direction $LONG_d$. To the contrary, belt plies used for prior high performance passenger tires employed elongate reinforcements forming a steel cable formed of four (4) twisted 0.3 mm diameter steel filaments, each of which were arranged to extend lengthwise 24 degrees relative to the longitudinal direction. The plurality of elongate reinforcements 44 in each of the one or more belt plies 40 are spaced apart centerline-to-centerline by substantially 1 mm with the elastomeric material 42 of each of the one or more belt plies, which defines the pace of the elongate reinforcements 44. The elastomeric material 42 has a thickness of 1.08 mm, and is characterized as having a modulus of elongation of less than 10.5 and loss due to hysteresis (P60) at 60 degrees of less than 26.5 as measured as a result of conducting a P8 pendulum test. Together with the elastomeric material 42, which settles in between the spaced-apart elongate reinforcements 44, each belt ply 40 before application to the tire in an uncured state has a thickness of 1.22 mm (where belt ply used for prior high performance passenger tire was 1.42 mm thick). In sum, the mass of each belt ply 40 is reduced 5.5% (reduced from 2.531 $kg/mm^2$ to 2.394 $kg/mm^2$) relative to belt plies previously used in related passenger (high performance) tires. Even though more elongate reinforcements 44 are included within any give size belt ply 40 due to the reduced pace, the additional elongate reinforcements do not offset the mass reduction achieved by reducing the elongate reinforcement diameter (which also permits a reduction in elastomeric material 42). As noted previously, a reduced hysteretic elastomeric material 42 may be employed, which in certain exemplary instances is characterized as having a hysteresis (P60) of less than 26.5, 23.5 or less, 17.5 to 23.5, or of substantially 20.5. In particular embodiments, elastomeric material 42 is characterized as having a hysteresis (P60) of substantially 20.5 and a modulus of elongation (MA10) substantially 6 MPa, which is contrasted with elastomeric material used in belt plies of prior high performance passenger tires was characterized as having a hysteresis (P60) of substantially 26.5 and a modulus of elongation (MA10) substantially 10.5 MPa.

With continued reference to FIG. 3, the crown portion 16 further includes a cap ply 50 arranged radially outward from the one or more belt plies 40 and from the annular belt structure formed by all belt plies contained within the tire. The cap ply 50 is provided to increase rigidity of crown portion 16 to counteract the effects of centrifugal forces generated during high speeds. The provision of the cap layer 50 described herein may be provided as a substitute to other cap layers previously employed by other tires or added to tires not previously incorporating a cap layer to control the expansion of the belt" (that is, all of the one or more belt plies 40), as may be required to attain certain vehicle speeds. For example, in particular instances, the cap ply 50 is employed together with other features of the tire described herein to provide a tire rated for vehicle speeds upwards of 186 miles per hour (mph) (a Y speed rating) or greater. The cap ply 50 is arranged between the tread 20 and the one or more belt plies 40 (the belt). The cap ply 50 extends substantially across a full width of at least one of the belt plies 40. In doing so, the cap ply 50 is arranged within each shoulder 18 or shoulder rib 32$_{S1}$, 32$_{S2}$. In other variations, the cap ply 50 may extend partially across the width of the belt, whether in width or if including spaces or gaps within the cap ply or cap layer, as may be suitable to achieve any intended high speed performance measures.

The cap ply 50 is formed of a layer of elastomeric material 52 reinforced with a plurality of elongate reinforcements 54 spaced apart in an array. The elongate reinforcements 54 are arranged to extend lengthwise substantially in a circumferential direction C$_d$ of the tire, that is, in a direction substantially parallel to a plane P$_{CL}$ bisecting the tire at its equatorial centerline CL$_A$ and extending perpendicular to rotational axis A. "Substantially parallel" means that any such elongate reinforcement 54 extends by an angle or 0 to 5 degrees in absolute value (that is, spanning −5 degrees to 5 degrees) relative to the longitudinal direction LONG$_d$ or plane P$_{CL}$.

Cap ply 50 may be applied in any desired manner. For example, in certain exemplary instances, cap ply 50 is formed using one or more sheets wound once around the tire, the sheets including the elastomeric material 52 and elongate reinforcements 54, while in other exemplary instances the cap ply 50 is formed using one or more strips wound multiple revolutions around the tire in a helical configuration, the strips including the elastomeric material 52 and elongate reinforcements 54. In winding into a helical configuration, each wind of the strip is arranged to abut the adjacent wind of strip, or, in other variations, may be spaced apart from or overlap an adjacent wind by as much as a 50% (providing a spacing or overlap, where, for example, a 50% overlap forms ½ pace between winds of the strip). It is appreciated that one or more cap plies 50 may be employed. At each widthwise end of the belt, before beginning the helical wind at one end and after reaching the other end after making the plurality of helical winds, a full revolution of the cap strip is made. In doing so, the cap ply extends 4 mm to 14 mm beyond the belt, that is, beyond the widest of the one or more belt plies 40 at each widthwise extent of the belt.

Each elongate reinforcement 54 may be formed of metal or non-metal elongate reinforcements, where elongate reinforcements are formed of a plurality of filaments arranged lengthwise and twisted along their lengths as desired. Metal elongate reinforcements are constructed from filaments most commonly formed of steel, but may be formed any metal having desirous properties. Non-metal reinforcements are constructed from filaments formed of any fabric or textile, such as polyester, rayon, nylon, aramid, silk, and/or fiberglass. In certain exemplary instances, the cap ply is characterized as having a rupture force greater than 3150 N per 15 mm of cap ply width, while in other instances the cap ply is characterized as having a rupture force ranging from 4650 N to 6150 N per 15 mm of cap ply width or substantially 5400 N per 15 mm of cap ply width. In any such embodiment, the cap ply may also be characterized as having a 4% elongation per 15 mm of cap ply width with application of a 100 N tensile force, and as having a 5.5% elongation per 15 mm of cap ply width with application of a 200 N tensile force. In particular embodiments, with reference to FIG. 3, for example, cap ply 50 is formed using a strip, such as a 15 mm wide strip, wound in a helical configuration fully across and beyond a full width of each of the pair of belt plies 40, where each wind of the strip abuts an adjacent wind of the strip and extends by a distance Δ50 of less than 15 mm beyond the full width of the widest belt ply 40 or of the annular belt structure at each widthwise extent in certain exemplary instances.

An exemplary elongate reinforcement 54 that may be employed within any such contemplated cap ply 50, including any cap sheet or cap strip used to form such ply, is characterized as having a rupture force ranging from 310 N to 410 N. In more specific instances, each elongate reinforcement 54 is characterized as having a rupture force substantially equal to 360 N, where such elongate reinforcements 54 arranged in an array having a 1 mm pace, where pace is the centerline-to-centerline spacing between adjacent elongate reinforcements 54. When using fifteen (15) elongate reinforcements 54 characterized as having a rupture force substantially equal to 360 N to form a 15 mm wide cap strip with a pace of 1 mm, the rupture force of the 15 mm wide strip is 5400 N and is characterized as having an elongation of 4% as measured at 100 N force and as having an elongation of 5.5% as measured at 200 N force. While other elastomeric material may be employed, in certain instances elastomeric material used to form any cap ply 50 or cap strip contemplated above may be characterized as follows in Table 1:

TABLE 1

| Property | Desired Range | Embodiment A |
| --- | --- | --- |
| MA10 | 5.8 to 7.8 MPa | 6.8 MPa |
| MA100 | 3.2 to 4.0 MPa | 3.6 MPa |
| MA300 | 3.4 to 4.2 MPa | 3.8 MPa |
| Hysteresis Loss, P60 | 18 to 23% | 20.5% |

In any such embodiment, for any cap ply 50 or cap strip contemplated herein, each elongate reinforcement 54 is formed of a two (2) yarn twist, where an aramid 167 filament is twisted with a nylon 140 filament at a rate of 290 turns per meter. In such instances, the rupture force for each elongate reinforcement is 360 N.

For any belt or cap ply formed of elastomeric material having elongate reinforcements, the array of elongate reinforcements may be coated with the elastomeric material or skim (layers) of elastomeric may be applied to opposing sides of the array. It is appreciated, however, that any other manner may be employed for providing any such ply.

In a prior art tire, a full-width cap layer is applied to a pair of belt plies, the cap layer being formed of elongate reinforcements that are formed of nylon. These prior art elongate reinforcements are characterized as having a 210 N rupture force, and when arranged in a 15 mm wide cap ply strip having a pace of 1 mm, the strip has a rupture force of 3150 N. Also, the cap ply is applied in a Z-configuration, where a cap ply strip is initially applied inward from an intended widthwise extent of the cap ply, the strip being wound outwardly to the nearest widthwise side, such as by two helical winds, for example, and then is wound helically in an abutting arrangement in a lateral direction across the tire to form a full width of the cap ply, and thereafter winding the strip back in towards away from the widthwise extent, such as by two helical winds, to complete the Z-configuration. As a result, the prior art cap layer is less rigid in both circumferential and in the axial directions. By employing a more rigid cap layer 50 as discussed herein, cap layer 50 overcomes the loss in rigidity provided by the more flexible and compliant tread 20 as achieved by the particular arrangement tread features. Specifically, the cap layer 50 described herein provides an increase in rigidity in the lateral (Y) direction, for improved D(Z) gain (in cornering stiffness) and for improved handling. The cap layer 50 described herein also provides an increase in rigidity in the longitudinal (X) direction, for improved wear and dry braking performance. In the prior art tire, the tire is characterized as having the droop and taper as articulated above and has the tire thickness at each widthwise extent previously articulated. It is also noted that the pair of prior art belt plies each employ elongate reinforcements each having a rupture force of 875 N and are arranged to extend lengthwise by 24 degrees relative to the longitudinal direction of the tire, where the prior art elongate reinforcements are steel cables formed of four (4) 0.30 mm diameter steel filaments twisted.

It is noted that tires formed according to this disclosure may achieve a Y speed rating, in accordance with DOT139 HSI testing method, such as any tire:
  a. having a cap ply arranged radially outward from the one or more belt plies and between the tread and the one or more belt plies, the cap ply extending substantially across a full width of at least one of the belt plies and being arranged at least partially within each shoulder, the cap ply forming a layer of elastomeric material reinforced with a plurality of elongate reinforcements spaced apart in an array, the cap ply being characterized as having a rupture force greater than 210 N per 15 mm of the cap ply width, or any other cap ply forming a variation thereof as described herein;
  b. where, at each widthwise extent of a radially outermost belt ply, as defined by the center of the laterally outermost reinforcement at its most laterally outward location, each widthwise extent being defined by the center of the laterally outermost reinforcement at its most laterally outward location, the tread thickness extends in a direction perpendicular to the outer, ground-engaging side a distance greater than 61% of the skid depth at the equatorial plane or in accordance with other variations thereof as described herein;
  c. where, at each widthwise extent of the rolling width, the tread thickness extends in a direction perpendicular to the outer, ground-engaging side a distance greater than 52% of the skid depth at the equatorial plane or in accordance with other variations thereof as described herein;
  d. where, at each widthwise extent of the radially outermost belt layer, as defined by the center of the laterally outermost reinforcement at its most laterally outward location, the tread thickness extends a radial distance from a horizontal line, the horizontal line extending from the skid depth at the equatorial plane, the radial distance extending to a bottom of the skid depth and equaling 50% to 80% of the skid depth at the corresponding widthwise extent of the radially outermost belt layer or in accordance with other variations thereof as described herein; and,
  e. where for a taper equation of $d_x = d_D (L_x/L_D)^P$, P is less than 3 or in accordance with other variations thereof as described herein.

When comparing such tires with the prior art tires described previously, in achieving a Y speed rating, an improvement in the high speed limit was observed when performing high speed testing, where tires are loaded on a test wheel and run continuously, where the speeds are increased incrementally every 10 minutes by 10 km/hr until the tire fails. When comparing the prior art tire to the tire described above using the high speed test, a high speed limit improvement between 15 km/hr (kilometer per hour) and 25 km/hr was achieved, which is an approximately 7% improvement. Additionally, these tires achieved a 20% improvement in wear over the prior art tires without sacrificing snow handling performance, which was observed a slight gain (a 0.75 SAE subjective point gain in accordance with SAE subjective testing standards). In sum, improved high speed performance is achievable using the unique combinations of features described herein, all while resulting in a thicker and less tapered tread in the shoulder areas, which typically reduces high speed performance. By virtue of providing a thicker tread in the shoulder areas, deeper grooves are achieved (represented by skid depth). Together, wear, hydroplaning, and snow performance is able to be improved. These results are surprising, and unexpected to one of ordinary skill.

To the extent used, the terms "comprising," "including," and "having," or any variation thereof, as used in the claims and/or specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the embodiments. Ranges that are described as being "between a and b" are inclusive of the values for "a" and "b" unless otherwise specified.

While various improvements have been described herein with reference to particular embodiments thereof, it shall be understood that such description is by way of illustration only and should not be construed as limiting the scope of any claimed invention. Accordingly, the scope and content of any claimed invention is to be defined only by the terms of the following claims, in the present form or as amended during prosecution or pursued in any continuation application. Furthermore, it is understood that the features of any specific embodiment discussed herein may be combined with one or more features of any one or more embodiments otherwise discussed or contemplated herein unless otherwise stated.

What is claimed is:

1. A pneumatic tire comprising:
  a pair of annular beads areas spaced apart axially along a rotational axis of the tire;
  a pair of sidewalls spaced apart axially along the rotational axis of the tire, each sidewall of the pair of sidewalls extending outwardly in a radial direction from one bead area of the pair of bead areas relative to the rotational axis;
  a crown portion arranged widthwise between the pair of sidewalls and extending annularly around the tire;
  the crown portion including a tread arranged annularly around the crown portion and forming an outer, ground-engaging side upon which the tire is intended to roll upon, the tread having a thickness extending radially and a width extending axially, the tread forming a wearing portion the tire;
  the crown portion further including one or more belt plies each forming a layer of elastomeric material reinforced with a plurality of elongate reinforcements spaced apart in an array;
  the crown portion further including a pair of shoulders, each shoulder forming a portion of the crown arranged adjacent to each sidewall, the crown portion further including a cap ply arranged radially outward from the one or more belt plies and between the tread and the one or more belt plies, the cap ply extending substantially across a full width of at least one of the belt plies and being arranged at least partially within each shoulder, the cap ply forming a layer of elastomeric material reinforced with a plurality of elongate reinforcements spaced apart in an array, the cap ply being characterized as having a rupture force greater than 3150 N per 15 mm of the cap ply width; and, the tread including a plurality of tread features including grooves extending a depth within the tread thickness;

the tread features extending into the tread thickness substantially to a depth defining a skid depth of the tread, the skid depth being the thickness of the tread intended to be worn during the intended life of the tire tread;

at each widthwise extent of the radially outermost belt ply, each widthwise extent defined by the center of the laterally outermost reinforcement at its most laterally outward location, the tread thickness extending in a direction perpendicular to the outer, ground-engaging side is greater than 61% of the skid depth at the equatorial plane;

at each widthwise extent of the rolling width, the tread thickness extending in a direction perpendicular to the outer, ground-engaging side is greater than 52% of the skid depth at the equatorial plane;

at each widthwise extent of the radially outermost belt layer, as defined by the center of the laterally outermost reinforcement at its most laterally outward location, the tread thickness extends a radial distance from a horizontal line, the horizontal line extending from the skid depth at the equatorial plane, the radial distance extending to a bottom of the skid depth and equaling 50% to 80% of the skid depth at the corresponding widthwise extent of the radially outermost belt layer;

where for a taper equation of $d_x = d_D(L_x/L_D)^P$, P is less than 3, where $d_x$ is the droop at a corresponding lateral distance $L_x$, $d_D$ is the droop at a distance $L_D$, $L_x$ and $L_D$ are distances extending laterally from the laterally outermost groove, and P is a taper power.

2. The tire of claim 1, where at each widthwise extent of the rolling width, the total thickness of the tire extending from an interior side to the outer, ground-engaging side is less than 480% of the skid depth at the equatorial plane.

3. The tire of claim 1, where at each widthwise extent of the radially outermost belt ply, the tread thickness extending in a direction perpendicular to the outer, ground-engaging side ranges from 68% to 70% of the skid depth at the equatorial plane.

4. The tire of claim 1, where at each widthwise extent of the rolling width, the tread thickness extending in a direction perpendicular to the outer, ground-engaging side ranges from 62% to 64% of the skid depth at the equatorial plane.

5. The tire of claim 1, where for taper equation $d_x = d_D(L_x/L_D)^P$, P is 2 to 2.7.

6. The tire of claim 1, where the tread is formed of an outer layer of elastomeric material characterized as having a glass transition temperature of −25° C. to −10° C., a tan delta of 0.4 to 0.6, a dynamic shear modulus of 1.0 to 1.4 MPa, a Mooney viscosity of 80 to 120, and a modulus of elongation (MA10) of 5.75 to 9.5.

7. The tire of claim 1, where the tread is forms an outer layer of elastomeric material and the tire further includes an inner layer of elastomeric material, the inner layer arranged radially inward from the outer layer between the outer layer and the one or more belt plies and cap ply, the inner layer being characterized as having a dynamic shear modulus equal to 58% to 68% of a dynamic shear modulus characterizing the tread, a modulus of elongation equal to 40% to 50% of the tread modulus of elongation, and a tan delta equal to 60% to 75% of the tread tan delta.

8. The tire of claim 7, where the outer layer of elastomeric material is characterized as having a glass transition temperature of −25° C. to −10° C., a tan delta of 0.4 to 0.6, a dynamic shear modulus of 1.0 to 1.4 MPa, a Mooney viscosity of 80 to 120, and a modulus of elongation (MA10) of 5.75 to 9.5.

9. The tire of claim 1, where each of the elongate reinforcements of the one or more belt plies form a 0.60 mm thick steel cable formed of two twisted steel cables each having a diameter of 0.3 mm and where the plurality of elongate reinforcements in each of the one or more belt plies are spaced apart centerline-to-centerline by substantially 1 mm and being characterized as having a modulus of elongation of less than 10.5 and loss due to hysteresis (P60) at 60 degrees of less than 26.5.

10. The tire of claim 1, where the one or more belt plies forms a pair of belt plies.

11. The tire of claim 1, where the rupture force is 4650 to 6150 N per 15 mm of width.

12. The tire of claim 1, where the rupture force is 5400 N per 15 mm of width.

13. The tire of claim 1, where the cap ply extends helically across the width of at least one of the one or more belt plies in a substantially abutted configuration.

14. The tire of claim 13, where the cap ply is formed of a strip wound continuously around the tire in a helical configuration with a circumferential wind at each widthwise extent of the cap ply width.

* * * * *

UNITED STATES PATENT AND TRADEMARK OFFICE
CERTIFICATE OF CORRECTION

PATENT NO. : 11,498,364 B2
APPLICATION NO. : 16/959073
DATED : November 15, 2022
INVENTOR(S) : Patrick Jon Buresh et al.

It is certified that error appears in the above-identified patent and that said Letters Patent is hereby corrected as shown below:

In the Specification

Please replace the text in Column 6, Line 8 where "6" should be replaced with "δ"

Please replace the text in Column 9, Line 18 where "cc" should be replaced with "α"

In the Claims

Please delete the word "is" in Claim 7, Column 18, Line 13

Signed and Sealed this
Twenty-eighth Day of March, 2023

*Katherine Kelly Vidal*

Katherine Kelly Vidal
*Director of the United States Patent and Trademark Office*